No. 841,674. PATENTED JAN. 22, 1907.
J. DODGE.
FEED WATER HEATER.
APPLICATION FILED MAR. 31, 1906.
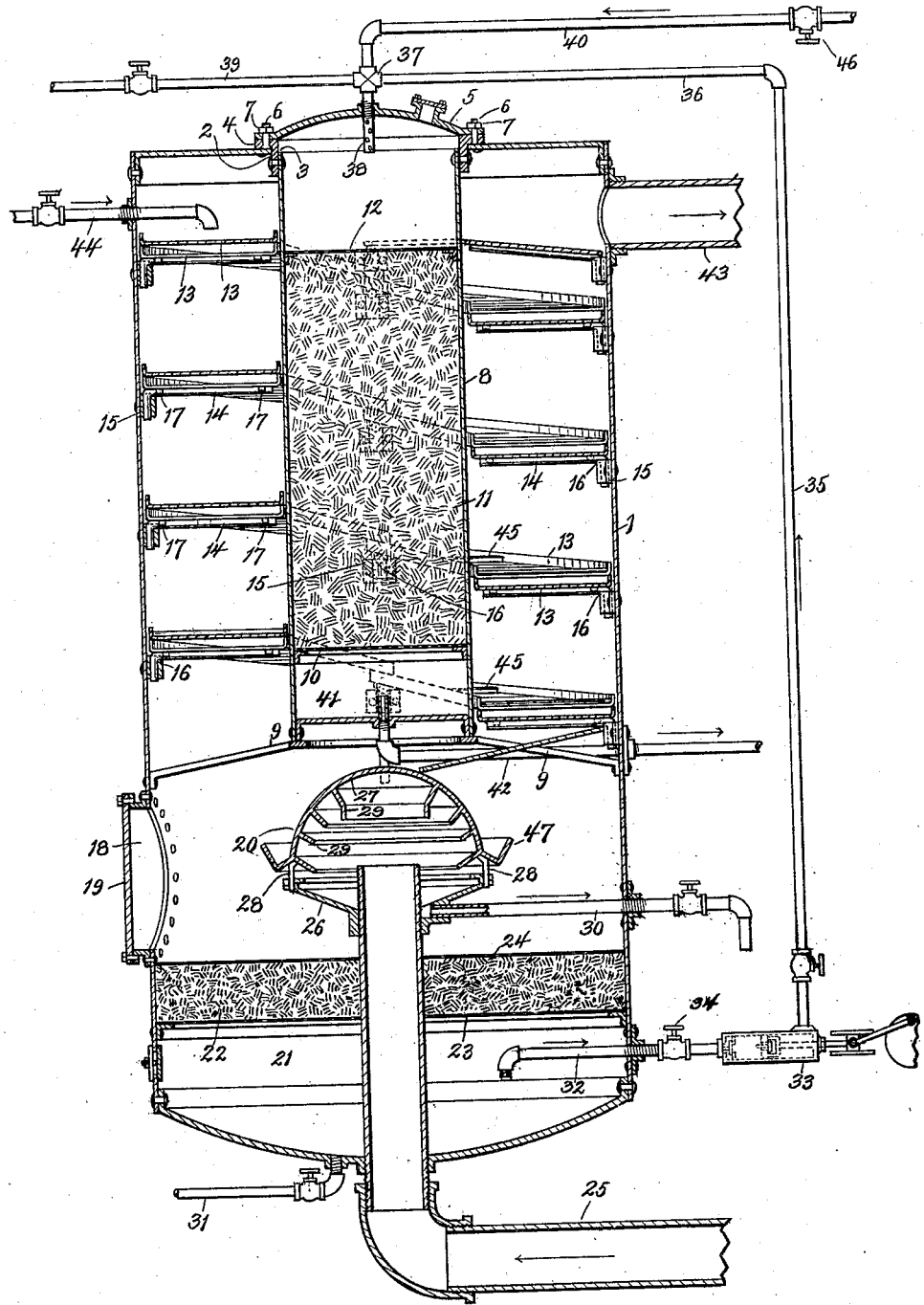
Witnesses.
Inventor.
John Dodge
By Benedict, Morsell & Caldwell
Attorneys.

UNITED STATES PATENT OFFICE.

JOHN DODGE, OF MILWAUKEE, WISCONSIN.

FEED-WATER HEATER.

No. 841,674.

Specification of Letters Patent.

Patented Jan. 22, 1907.

Application filed March 31, 1906. Serial No. 309,038.

*To all whom it may concern:*

Be it known that I, JOHN DODGE, residing in Milwaukee, in the county of Milwaukee and State of Wisconsin, have invented new and useful Improvements in Feed-Water Heaters, of which the following is a description, reference being had to the accompanying drawings, which are a part of this specification.

My invention has relation to improvements in feed-water heaters.

It is a well-known fact that if a boiler is kept thoroughly cleaned it means a saving in fuel, a saving in repairs, particularly to the engines and boilers, a saving in time, and greatly-reduced liability of explosion. Experience has demonstrated that it is impossible to get all the different kinds of ingredients out of the water that go to make up the incrustations or scale that form on the inside of boilers without bringing the feed-water before it reaches the boiler to the same degree of heat or temperature that is in the boiler. It is of course essential for the best results that the water be rendered as nearly pure as possible before it enters the boiler, and the higher the degree of heat to which the water is subjected the nearer it will approach a pure condition.

It is the object, therefore, of my invention to provide a construction wherein the above desirable end is reached by a simple, economical, and convenient arrangement; and with this primary object and other incidental objects in view the invention consists of the devices and parts or the equivalents thereof, as hereinafter more fully set forth.

The drawing represents a vertical sectional view of a feed-water heater constructed in accordance with my invention.

Referring to the drawing, the numeral 1 indicates the outer jacket or casing, preferably of cylindrical form. The top of this casing is provided with a manhole 2, and fitting the bordering edge of this manhole is a ring 3, having its upper edge turned outwardly to form an annular flange 4, which rests on the top of the casing. A manhole-cover 5 rests on the annular flange 4 and is secured thereto by means of bolts 6, the said bolts having their upper ends threaded to receive nuts 7. By turning the nuts off the threaded upper ends of these bolts it is evident that the manhole-cover can be readily removed. The ring portion 3 projects downwardly into the interior of the outer jacket 1 for a slight distance and has riveted thereto the upper end of an inner casing 8, preferably of cylindrical form. The lower end of this casing is supported by means of bracket-arms 9. At a short distance above the bottom of the casing 8 is a reticulated or screened horizontal partition 10, which supports a column of filtering material 11, preferably, although not necessarily, sand. If desired, a reticulated or perforated plate 12 may cover the upper surface of the filtering material in order to hold said filtering material and prevent the same from splashing.

Surrounding the inner casing is a spiral passage the width of which is sufficient to extend substantially from the outer casing or jacket to the said inner casing. This spiral passage or waterway is preferably composed of a series of separate pans 13 so disposed with relation to each other that the upper end of each successive pan will underlie the lower end of the next preceding pan, or, stating the arrangement conversely, so that the lower end of each pan will overlap the upper end of the next succeeding pan of the series. These pans are of trough-like shape, as clearly shown. It is desirable that the pans should be readily removable, and to secure this end I provide supports therefor of the peculiar construction about to be described. These supports are disposed at the points where the ends of the pans meet and overlap. Each supporting device consists of a transverse rod 14, having its outer end bent downwardly at an angle and fitting in a vertical opening formed in a lug 15, secured to the inner side of the outer casing 1. To prevent each rod from turning in the openings of the lugs, the upper edge of each lug is provided with a recess 16, into which the rod proper is seated. As the several troughs are necessarily disposed on inclined planes, they would slide downwardly from off the rods 14 if some means were not provided for preventing this. In the accompanying drawing I show each pan provided on its under side and at the upper end thereof with depending lugs 17 17, which fit against the rods 14, and thereby prevent slipping of the pans.

The outside casing 1 at a point below the lower end of the inner casing 8 is provided with a manhole 18 with a suitable removable cover 19. This manhole 18 opens into an exhaust-steam chamber 20. Below the exhaust-steam chamber is a hot-water chamber 21, the two chambers being separated by means of a filtering material 22, preferably sand, said filtering material being supported by a perforated supporting-plate 23 and the top surface of the filtering material being held down by means of a top perforated plate 24. Passing centrally through the filtering material 22 is an exhaust-steam inlet-pipe 25, the upper end thereof terminating a desired distance above the top perforated plate 24. The upper end of this pipe supports a pan 26. The attachment of this pan to the upper end of pipe 25 is secured, preferably, by forming the bottom of the pan with a screw-threaded opening and having the threads engage exterior threads on the upper end of the pipe. The pan is turned down on the pipe a sufficient distance to permit the upper extremity of the said pipe to extend a slight distance above the upper edge of the pan. A hood 27, preferably of bell-shaped form, is supported above the upper end of pipe 25 and over the pan, and the support is preferably such that the hood may be readily removed for cleaning purposes. To this end I show the hood as provided with depending arms 28, which are bolted to the outer edge of the pan. It is obvious that when these bolts are taken out the hood can be readily removed from its position for cleaning purposes. The hood is preferably of the rounded or bell-like form for the purpose of providing a greater space within which the exhaust-steam may expand. Projecting from the inner surface of the hood are a series of rings 29. These rings are for the purpose of separating the oil and other sediment from the steam, the said oil and sediment settling on these depending rings and dripping down into the pan 26. From the said pan leads an oil-drip pipe 30, which extends through the outer casing or jacket 1 and leads to a suitable point for discharge. It is obvious that as the oil accumulates in the pan 26 it is drained off by means of this pipe 30. The bottom of the hot-water chamber 21 is provided with a valve-controlled drain-pipe 31, from which sediment which may accumulate in the said chamber 21 may automatically discharge by gravity when the valve is opened.

The inner end of a pipe 32 is located in the chamber 21, and this pipe leads outwardly to an ordinary form of suction-pump 33. A valve 34 is arranged in the pipe between the pump and the jacket or casing 1. Extending upwardly from the pump is a vertical pipe 35, which at its upper end has connected thereto a horizontal branch 36, the said horizontal branch connecting with one side member of a cross-coupling 37. Secured to and depending from the lower member of this cross-coupling is a nipple 38, said nipple passing through the manhole-cover 5 and into the inner casing 8 for a slight distance. From the other side member or branch of the cross-coupling extends a valve-controlled blow-off pipe 39, and extending to and connected with the top branch or member of the cross-coupling is a live-steam pipe 40. This live-steam pipe of course extends from the boiler. Passing through the bottom of the inner casing 8 and into the filtered-water chamber 41, which lies below the lower supporting perforated plate 10, is a pipe 42. This pipe below the bottom of the casing 8 is turned outwardly and passed through the jacket or casing 1 and extended to the boiler.

Communicating with the upper portion of the interior of the jacket or casing 1 and extended to a suitable point of discharge is an exhaust-steam-outlet pipe 43. By the provision of this pipe 43, in connection with the inlet-pipe 25 for the exhaust-steam, a construction is provided whereby the exhaust-steam is utilized for the heating of the water in the outer casing, and this exhaust-steam after serving to heat the water is free to escape through the outlet-pipe 43, thus providing what I term an "open exhaust-steam feed-water heater."

Leading through the casing 1 into the space of the casing above the upper series of the troughs or pans of the spirally-arranged waterway is a valve-controlled water-inlet pipe 44 from any suitable source of supply.

It will be noticed that the last few troughs of the spiral waterway forming the lower portion of said waterway are provided with transverse riffle-bars 45 for a purpose hereinafter to be explained.

The operation of the invention is as follows: The valve of pipe 44 being open, cold water is thereby free to pass into the casing 1 and to be discharged onto the upper portion of the spiral waterway formed by the sectional troughs. The water will spread over the surfaces of these troughs in a thin sheet, whereby the ready heating of the same is facilitated. The water of course flows down the waterway in a spiral course around the inner casing and is discharged from the lowermost casing and is discharged from the lowermost trough or pan of the series. The water thus passing around the inner casing is heated by the heat radiated from the said casing and also heated from the exhaust-steam circulating upwardly in the spiral spaces between the troughs in the manner hereinafter described. The water as it is discharged from the lowermost trough of the series and enters the chamber 20 is heated by the exhaust-steam discharged into said chamber through the pipe 25. This exhaust-steam, as hereinbefore explained, is directed against the under side of the dome 27 and is broken up by the ring projections 29, and the oil and sediment contained in the steam drop from the ring projections into the pan 26 and are discharged through the pipe 30 when the valve of said pipe is opened. A certain percentage of the exhaust-steam which is discharged into the chamber 20 and which also flows upwardly is condensed, and the water of condensation mingles with the water discharged into said chamber from the spiral passage, and the body of water then passes through the perforated plate 24, thence through the filter 22 and through the bottom perforated plate 23, being received in the chamber 21. From the chamber 21 it is drawn by the action of the suction-pump 33 and thence forced upwardly in the pipe 35, thence along the branch pipe 36 and through the nipple 38 into the space of the casing 8 above the filtering material 11, thence through the perforated plate 12, through the said filtering material, thence into the filtered-water chamber 41, and finally through the pipe 42 to the boiler. The water after passing through the operation described is purified to the maximum and is received in the boiler in such pure condition as to secure the greatest benefits and prevent to a very great extent injury to the boiler by incrustation or scales formed by the action of impure water thereon, as is now the prevalent condition in the use of feed-water heaters. So much of the exhaust-steam discharged out of the end of the pipe 25 which passes upwardly from chamber 20 and is not condensed circulates in the spiral spaces between the troughs constituting the spiral waterway and also passes through the narrow spaces which are left between the outer edges of the troughs and the inner side of the outer casing 1, as well as the narrow spaces left between the inner edges of the troughs and the outer surface of the casing 8. This steam finally reaches the top portion of the casing 1 above the spiral waterway and discharges therefrom through the exhaust-steam-outlet pipe 43. From this arrangement it will be seen that not only are the bottoms of the pans or troughs along which the water flows heated, but also the side edges thereof, and, furthermore, the entire upper surface of the water contained in the troughs is exposed to the action of the steam thereon and thereby heated.

In feed-water heaters as heretofore constructed it has been the practice to circulate the cold water around the interior of a casing with provision for heating the said water during its passage through the casing and then permitting the said water to pass through a suitable filter, after which it is drawn directly into the boiler. So far as I am aware no feed-water heater has been constructed previous to my invention whereby the cold water introduced into the outer casing is caused to circulate around an inner casing and subjected to the action of heat, thence passed through a suitable filtering material, thence drawn out of the casing and back into the inner casing and there again subjected to the action of heat, thence passed through a filtering material within said inner casing, and finally caused to flow to the boiler. Furthermore, not only is the water subjected to the action of heat in its passage around the inner casing, but it is again subjected to heat after its passage through the first filter.

The object of introducing live steam into the upper end of the inner casing 8 is as follows: When the water after passing through the filter 22 settles in the lower water-chamber 21, it is at a temperature of about 210° or 212°. It is desirable that this water when it enters the inner casing should be the same temperature as the boiler temperature, inasmuch as it is obvious that the greater degree of heat imparted to the water the more impurities will be removed therefrom. By introducing the live steam into the top of the inner casing 8, therefore, which live steam meets the water at the coupling 37, the said water as it accumulates within the inner casing 8 is brought to the same temperature as the boiler temperature—that is, to say, about 330° for every one hundred pounds of steam. Another advantage of my construction resides in the fact that a large proportion of the exhaust-steam which passes into the casing out of the exhaust-steam pipe 25 is condensed, thereby relieving to a great extent back pressure on the engine and increasing the boiler capacity without at the same time losing any of the beneficial effects of the heating capacity of the exhaust-steam.

The riffle-bars 45, extending across several of the lower troughs of the series constituting the spiral water-course, are for the purpose of retarding and holding back the water in order to cause precipitation and purification of the water, as it is evident that the retardation of the flow of water gives opportunity for precipitation and also prevents too rapid flow of the water, thereby affording ample opportunity for heating. I would further call attention to the fact that all sediment and lime deposited in the apparatus can be readily removed, the sediment accumulating in the chamber 21 being free to discharge through the pipe 31 when the valve of said pipe is opened and the sediment accumulating in the inner casing 8 being removed by blowing out the said sediment through the pipe 39. It will be noticed that the live-steam pipe 40 is provided with a valve 46. In the operation of blowing out this valve is closed, so as to prevent passage of live steam through the pipe 40 into the top of casing 8, and live steam is permitted to flow from the boiler through the pipe 42. This steam passes through the filtering material 11 and carries the sediment, most of which accumulates in the space of the casing 8 above the filtering material, through the nipple 38, and thence out through the pipe 39, the valve of said pipe of course having been opened. The dirt and sediment collecting on plate 24 may be removed by blowing through pipe 32. A further great advantage of my invention resides in the facilities afforded for cleaning the entire interior of the apparatus. It will be understood that the manhole 18 is large enough for the admission therethrough of a man, who can stand erect inside of the casing or shell 1 and readily remove the dome or bell-shaped deflector for cleaning purposes and also remove each of the troughs or pans 13 from their supports, as well as the supports themselves—viz., the rods 14. By thus removing these pans 13 and the supporting-rods 14 the entire interior of the casing or jacket is free from obstructions and can be thoroughly cleaned. When it is desired to clean the inner casing 8, all that is necessary to be done is to turn the nuts 7 off the bolt 6 and then remove the cover of the manhole 2, which will afford opportunity for a man entering the casing 8 and thoroughly cleaning the interior thereof. Before removal of the cover of the mahole 2 it will of course be necessary to disconnect the pipes 36 and 39 and nipple 38 from coupling 37. I would further call attention to another advantage possessed by the hood 27. It will be understood that the water discharged from the waterway falls onto the outer convex surface of this deflector, which causes the water to spread and run down said surface, and while dripping off the lower edge of said filter it meets the exhaust-steam issuing out of the space between the top edge of pan 26 and lower edge of deflector 27. I would also state further in reference to pipe 30 that it not only removes oil and sediment from pan 26, but, furthermore, if the filter 22 should clog up with sediment and water accumulate in the chamber above said filter it will flow over the upper edge of pan 26 and be drained off by pipe 30, thereby preventing flooding of the chamber 20. The water thus drained in the manner stated will also carry off with it any oil or sediment or dirt which may have accumulated in the pan. Another feature of my invention which I deem it advisable to refer to is the provision of a trough 47 around the lower portion of the deflector 20. This trough serves to catch the water which is discharged onto the convex outer side of the deflector, the said water overflowing over the side of the trough. By this means sediment which may be carried in the water in its flow along and off of the spiral waterway is caught and retained by the trough.

What I claim as my invention is—

1. In a feed-water heater, the combination with inner and outer casings, and a waterway between the two and encircling the inner casing and adapted to discharge the water from the lower end thereof, means for feeding water into the casing and onto the waterway, means for heating the water in its passage along the waterway, a filter through which the water percolates after being discharged from the waterway, a pipe connecting the outer casing with the inner casing, and adapted to conduct the filtered and heated water into said inner casing, a filter in the inner casing, and a pipe leading from the inner casing and adapted to conduct the water after its second filtration to the boiler.

2. In a feed-water heater, the combination with inner and outer casings and a waterway between the two and encircling the inner casing, and adapted to discharge the water from the lower end thereof, means for feeding water into the casing and onto the waterway, means for heating the water in its passage along the waterway, a filter through which the water percolates after being discharged from the waterway, a pipe connecting the outer casing with the inner casing and adapted to conduct the filtered and heated water into said inner casing, a live-steam pipe having communication with the inner casing and adapted to discharge live steam therein, a filter in the inner casing and a pipe leading from the inner casing and adapted to conduct the water, after its second filtration, to the boiler.

3. In a feed-water heater, the combination of an outer jacket or casing, an inner casing suspended in said outer casing, a waterway within the outer casing and encircling the inner casing, means for introducing water into the outer casing so as to flow along the waterway and off the lower end of said waterway, means for introducing a heating agent into the outer casing, so that it shall circulate in the space above and below the waterway, a discharge for said heating agent, a filter in the lower portion of the outer casing but arranged above the bottom of said casing so as to form a hot-water chamber below the filter, a pipe leading from said chamber and to and into the inner casing, means for drawing the water from the hot-water chamber into said pipe and forcing the same along the pipe and into the inner casing, a filter within the inner casing, and a pipe leading from said inner casing and adapted to conduct the filtered feed-water to the boiler.

4. In a feed-water heater, the combination of an outer jacket or casing, an inner casing suspended in said outer casing, a waterway within the outer casing and encircling the inner casing, means for introducing water into the outer casing so as to flow along the waterway and off the lower end of said waterway, an exhaust-steam pipe leading and adapted to discharge into the outer casing, so that the steam discharged from said pipe shall circulate in the spaces above and below the waterway, an exhaust-steam discharge, a filter in the lower portion of the outer casing, but arranged above the bottom of said casing so as to form a hot-water chamber below the filter, a pipe leading from said chamber to and into the inner casing, means for drawing the water from the hot-water chamber into said pipe and forcing the same along the pipe and into the inner casing, and a pipe leading from said inner casing and adapted to conduct feed-water to the boiler.

5. In a feed-water heater, the combination of an outer jacket or casing, an inner casing suspended in said outer casing and terminating at a point a distance above the bottom of the outer casing, a waterway within the outer casing and encircling the inner casing, means for introducing water into the outer casing so as to flow along the waterway and off the lower end of said waterway, an exhaust-steam pipe leading into the space of the outer casing below the lower end of the inner casing, so that the steam discharged from said pipe shall circulate in the space above and below the waterway, a hood above the upper end of the exhaust-steam pipe, a pan below said hood, a drain-pipe leading from the pan, an exhaust-steam discharge leading from the outer casing, a filter in the lower portion of the casing, but arranged above the bottom of said casing so as to form a hot-water chamber below the filter, a pipe leading from said chamber to and into the inner casing, means for drawing water from the hot-water chamber into said pipe and forcing the same along the pipe and into the inner casing, a filter within the inner casing, and a pipe leading from the inner casing and adapted to conduct the feed-water to the boiler.

6. In a feed-water heater, the combination of an outer jacket or casing, a waterway within said casing, means for feeding water into the casing so as to flow along the waterway and off the lower end of said waterway, a steam-pipe leading into the space of the outer casing below the waterway, so that the steam discharged from said pipe shall circulate in the space above and below the waterway, a hood above the upper end of the steam-pipe, and adapted to have the water discharged on the outer surface thereof, a pan below said hood, a drain-pipe leading from the pan, a steam-discharge leading from the casing, and means for conducting the water from out the casing to the boiler.

7. In a feed-water heater, the combination of a jacket or casing, a waterway within said casing, means for introducing water into the casing so as to flow along the waterway and off the lower end of said waterway, a steam-pipe leading into the space of the casing below the waterway, so that the steam discharged from said pipe shall circulate in the space above and below the waterway, a hood above the upper end of the exhaust-pipe, and adapted to have the water discharged onto the outer surface thereof, the under side of said hood provided with a series of downwardly-extending projections, a pan below said hood, a drain-pipe leading from the pan, a steam-discharge leading from the casing, and means for conducting the water from the casing to the boiler.

8. In a feed-water heater, the combination of a jacket or casing, a waterway within the casing, means for introducing water into the casing so as to flow along the waterway and off the lower end of said waterway, a steam-pipe leading into the space of the casing below the waterway, so that the steam discharged therefrom shall circulate in the space above and below the waterway, a hood above the upper end of the steam-pipe, the water adapted to be discharged onto the outer surface thereof, and the under side of the said deflector provided with a series of downwardly-extending ring projections, a pan below the deflector, a drip-pipe leading from the pan, a steam-discharge leading from the casing, and means for conducting the water from the casing to the boiler.

9. In a feed-water heater, the combination of a jacket or casing having means therein for the circulation of water therethrough, a steam-pipe entering the interior space of the casing and adapted to discharge steam into said casing, a steam-discharge pipe leading from the casing, a hood arranged over the discharge end of the steam-pipe, said hood adapted to have the water discharged onto the outer surface thereof, a pan below the hood, a drain-pipe leading from the pan, and means for conducting the water out of the casing to the boiler.

10. In a feed-water heater, the combination of an outer jacket or casing, an inner casing suspended in said outer casing, a waterway within the outer casing and encircling the inner casing, the side edges of said waterway being slightly removed from contact with the inner side of the outer casing and the outer side of the inner casing, means for introducing water into the outer casing so as to flow along the waterway and off the lower end of said waterway, means for introducing a heating agent into the outer casing, so that said heating agent shall circulate in the space above and below the waterway, a discharge for said heating agent, a pipe for conducting the said heated water to and into the inner casing a filter within the inner casing, and a pipe leading from said inner casing and adapted to conduct the feed-water to the boiler.

11. In a feed-water heater, the combination of an outer jacket or casing, an inner casing suspended in said outer casing, a waterway within the outer casing and encircling the inner casing, means for introducing water into the outer casing so as to flow along the waterway and off the lower end thereof, means for introducing a heating agent into the outer casing, so that said heating agent shall circulate in the space above and below the waterway, a discharge for said heating agent, a filter in the lower portion of the outer casing through which the heated water percolates, a pipe for conducting the water after its first filtration to and into the inner casing, a filter within the inner casing, and a pipe leading from said inner casing and adapted to conduct the feed-water to the boiler.

12. In a feed-water heater, the combination of a jacket or casing, a spiral waterway within said casing, and consisting of a series of separate pans overlapping each other at adjacent ends, the under sides of said pans provided with downwardly-projecting lugs, lugs on the inner wall of the jacket or casing and provided with vertical openings, rods beneath the overlapping ends of the pans and against which the downwardly-projecting lugs of the pans bear, the outer ends of said rods being bent downwardly and fitted in the vertical openings of the lugs of the jacket or casing, and the portion of each rod which is in advance of the downwardly-turned end being seated in a notch in the upper edge of each jacket-lug, means for introducing water into the inner casing so as to flow along the waterway and off the lower end thereof, means for introducing a heating agent in the casing, so that said heating agent shall circulate in the space above and below the waterway, a discharge for said heating agent, and means for conducting the heated water to the boiler.

13. In a feed-water heater, the combination of a jacket or casing, having a manhole-opening provided with a removable cover, a waterway within the casing, means for introducing water into the casing so as to flow along the waterway and off the lower end of said waterway, a steam-pipe entering the space of the casing below the waterway, a pan at the upper end of said pipe, a hood removably supported above the upper end of the pipe and above the pan, a discharge for said steam, and means for conducting the heated water to the boiler.

14. In a feed-water heater, the combination of an outer jacket or casing having an opening in its top, an inner casing secured to the edge of the top opening of the outer casing and extending downwardly a desired distance into said outer casing, a removable cover for said opening of the outer casing and the upper open end of the inner casing, a waterway within the outer casing and encircling the inner casing, means for introducing water into the outer casing so as to flow along the waterway and off the lower end of said waterway, means for introducing a heating agent into the outer casing, so that it shall circulate in the space above and below the waterway, a discharge for said heating agent, a filter in the lower portion of the outer casing through which the heated water is adapted to percolate, a pipe adapted for conducting said heated and filtered water into the inner casing, a filter within the inner casing, and a pipe leading from said inner casing and adapted to conduct the feed-water to the boiler.

15. In a feed-water heater, the combination of an outer jacket or casing, an inner casing suspended in said outer casing, a waterway within the outer casing and encircling the inner casing, means for introducing water into the outer casing so as to flow along the waterway and off the lower end of said waterway, means for introducing a heating agent into the outer casing, so that it shall circulate in the space above and below the waterway, a discharge for said heating agent, a filter in the lower portion of the outer casing through which the heated water percolates, a pipe leading from the space of the casing below the filter to and into the inner casing, means for drawing water from said space into said pipe and forcing the same along the pipe and into the inner casing, a live-steam pipe connecting with said water-pipe, a filter within the inner casing, and a pipe leading from said inner casing and adapted to conduct the feed-water to the filter.

16. In a feed-water heater, the combination of an outer jacket or casing, an inner casing suspended in said outer casing, a waterway within the outer casing and encircling the inner casing, means for introducing water into the outer casing so as to flow along the waterway and off the lower end of said waterway, means for introducing a heating agent into the outer casing, so that it shall circulate in the space above and below the waterway, a discharge for said heating agent, a filter in the lower portion of the outer casing, a pipe leading from the space below the filter and to and into the inner casing, means for drawing the water from the said space into the said pipe and forcing the same along the pipe and into the inner casing, a filter within the inner casing, a pipe leading from said inner casing and adapted to conduct the feed-water to the boiler, and a valve-controlled blow-off pipe communicating with the water-pipe at a point outside of the casing.

17. In a feed-water heater, the combination of a jacket or casing, a waterway within said casing, means for feeding water into the casing so as to flow along the waterway and off the lower end of said waterway, a steam-pipe leading into the space of the casing below the waterway, so that the discharged steam therefrom shall circulate in the space above and below the waterway, a hood above the upper end of the steam-pipe, and adapted to have the water discharged on the outer surface thereof, a trough around the outer side of the hood and at the lower portion thereof, a pan below the hood, a drain-pipe leading from the pan, a steam-discharge leading from the casing, and means for conducting the water from out of the casing to the boiler.

18. In a feed-water heater, the combination with inner and outer casings, and a waterway between the two and encircling the inner casing and adapted to discharge the water from the lower end thereof, means for feeding water into the casing and onto the waterway, means for heating the water in its passage along the waterway, a pipe connecting the outer casing with the inner casing, and adapted to conduct the heated water into said inner casing, a filter in the inner casing, and a pipe leading from the inner casing and adapted to conduct the water to the boiler.

In testimony whereof I affix my signature in presence of two witnesses.

JOHN DODGE.

Witnesses:
   A. L. MORSELL,
   ANNA F. SCHMIDTBAUER.